United States Patent Office 3,553,177
Patented Jan. 5, 1971

3,553,177
PROCESS OF FORMING COPOLYMERS OF MALEIC ANHYDRIDE AND AN ALIPHATIC OLEFIN HAVING AT LEAST 30 CARBON ATOMS
Stanley M. Hazen, Cheswick, and William J. Heilman, Allison Park, Pa., assignors to Gulf Research & Development Company, Pittsburgh, Pa., a corporation of Delaware
No Drawing. Filed May 26, 1969, Ser. No. 827,923
Int. Cl. C08f 25/00, 47/03
U.S. Cl. 260—78.5                 9 Claims

ABSTRACT OF THE DISCLOSURE

Maleic anhydride and an aliphatic olefin having at least 30 carbon atoms per molecule are copolymerized in the presence of a solvent comprising an aliphatic ketone having from 3 to 5 carbon atoms, such as methylethylketone, and in the presence of a free-radical catalyst using a sufficient amount of ketone to maintain not only the reactants but also the copolymer products in solution. The unreacted monomers are precipitated from the reaction product solution in a filterable particulate solid form by cooling the reaction product solution to a temperature less than the crystallization temperature of the aliphatic olefin in the presence of sufficient additional amounts of ketone solvent, if required, to maintain the copolymer in solution and precipitate the olefin monomer in a finely divided filterable form. The precipitated monomer can then be separated from the copolymer solution by any suitable means, such as filtration.

This invention relates to the preparation of a copolymer of maleic anhydride and an aliphatic olefin having at least 30 carbon atoms per molecule substantially free of unreacted olefin monomers.

Because of the relatively high molecular weight of the $C_{30+}$ olefin monomers, it is difficult to separate unreacted olefin monomers from copolymeric products made by the reaction of these high carbon number olefin monomers and maleic anhydride. It is necessary, however, to achieve this separation since the conversion of the olefin monomers is rarely over about 50 percent and the presence of the unreacted monomers in the copolymer is undesirable as the monomers may interfere in desired reactions involving the copolymers, such as in the preparation of crosslinked resins by reaction of the copolymers with epoxide containing compounds. Usually, the copolymers are precipitated during reaction or afterwards by precipitation in a non-solvent. A procedure has now been discovered for the preparation of maleic anhydride-olefin copolymers where the olefin has at least about 30 carbon atoms per molecule substantially free of unreacted olefin monomers.

In accordance with the invention, a copolymer of maleic anhydride and an olefin having at least about 30 carbon atoms per molecule is prepared substantially free of unreacted monomer olefin by a process which comprises:

Copolymerizing maleic anhydride and at least one of said olefins in the presence of a free-radical catalyst and a sufficient amount of an aliphatic ketone solvent having from three to five carbon atoms to maintain the maleic anhydride, aliphatic olefin and the resulting copolymer in solution at reaction temperature;

Cooling said copolymer reaction product to a temperature less than the melting point of said aliphatic olefin to precipitate said aliphatic olefin in a filterable solid form while maintaining said copolymer in solution by the addition of further amounts of an aliphatic ketone having from three to five carbon atoms if required;

Separating said precipitated aliphatic olefin; and

Thereafter separating said copolymer from said aliphatic ketone having from three to five carbon atoms.

In one preferred embodiment of the invention, the copolymer reaction product solution prepared as described above is added to a further amount of an aliphatic ketone having from three to five carbon atoms while maintaining the reaction temperature below the crystallization temperature of the aliphatic olefin, the further amounts of aliphatic ketone being sufficient to result in the precipitation of the olefin in a finely divided filterable form while maintaining the copolymer in solution.

The olefinic reactant can be a single olefin or a mixture of two or more olefins having at least about 30 carbon atoms per molecule. The preferred olefins are the aliphatic alpha-olefins having at least about 30 carbon atoms per molecule. If a mixture of olefins is employed, preferably the olefins are composed of greater than 75 weight percent olefins having from about 30 to 40 carbon atoms per molecule, and greater than 90 weight percent of olefins having from about 30 to 50 carbon atoms per molecule, the remaining amounts of olefin having up to 100 carbon atoms or more. The olefins can be obtained from any suitable source, such as the cracking of wax or other paraffinic-type hydrocarbons, or by the so-called telomerization process wherein a small olefin, such as ethylene, is reacted in the presence of a metal alkyl, such as aluminum triethyl, to produce higher carbon number olefins or mixtures of higher carbon number olefins. The telomerization process is normally run in a continuous manner, such as in a coil reactor, as described more fully in Ser. No. 608,127 to Fernald et al., filed in the United States Patent Office on Jan. 9, 1967, the disclosure of which is incorporated herein by reference. Only even numbered olefinic products, predominantly alpha-olefins, are produced, for example, the $C_{30+}$ alpha-olefins useful in the process of this invention can be produced. Typically, a $C_{30+}$ olefinic fraction is recovered as a still pot residue by the steam fractionation of the $C_{12+}$ reaction product from the telomerization process. This $C_{30+}$ fraction normally contains greater than 75 weight percent of $C_{30}$ to $C_{40}$ olefins and greater than 90 weight percent of $C_{30}$ to $C_{50}$ olefins. It has been found that this mixture of aliphatic alpha-olefins from the telomerization process is ideally suited for use in the process of this invention. The melting point of this mixture of $C_{30+}$ olefins is about 55° C. to 75° C.

Examples of suitable olefins include, but are not limited to:

1-triacontene;
1-dotriacontene;
1-tritriacontene;
1-hexatriacontene;
1-tetratriacontene;
1-octatriacontene;
1-tetracontene;
1-dotetracontene;
1-tetratetracontene;
1-hexatetracontene;
1-octatetracontene;
1-pentacontene;
2-pentatriacontene;
3-propyl-1-heptatriacontene;

or mixtures thereof.

Maleic anhydride is the other reactant used to prepare the desired copolymers by the process of this invention. It is preferred that the maleic anhydride be substantially free of maleic acid. The maleic anhydride will, of course, react with water to form the undesired maleic acid. Commercial maleic anhydride is suitable for use in the process of this invention, but in the event it is exposed to water and thereby becomes contaminated with maleic acid, means should be employed to remove the maleic acid before the maleic anhydride is used in the subject process. One suitable method of purifying the maleic anhydride is to dissolve the maleic anhydride in a liquid, such as benzene, which is a solvent for the maleic anhydride but a nonsolvent for the maleic acid. The acid can then be separated by filtration or otherwise and the maleic anhydride recovered by evaporation of the benzene.

The unreacted maleic anhydride is usually the more difficult monomer to remove from the polymer, and therefore it is desirable to react essentially all of the maleic anhydride. Both the rate at which the maleic anhydride reacts and the total conversion of maleic anhydride can be increased by increasing the olefinic reactant concentration relative to the maleic anhydride. The molar ratio of olefin to maleic anhydride can vary between 0.1:1 and 100:1 with preferred molar ratios between 1:1 and 4:1. Due to the greater reactivity of the vinylidene-type olefins, a slightly lower molar ratio can be employed.

The polymerization reaction is a solution-type polymerization wherein the maleic anhydride and olefin monomers are dissolved in a common solvent. The copolymerization can be initiated by any free-radical producing material well known in the art. The preferred free-radical initiators are the peroxide-type polymerization initiators and the azo-type polymerization initiators. Benzoyl peroxide is the most preferred initiator. Radiation can also be used to initiate the reaction, if desired.

The peroxide-type free-radical initiator can be organic or inorganic, the organic peroxides having the general formula:

$$R_7OOR_8$$

where $R_7$ is any organic radical and $R_8$ is selected from the group consisting of hydrogen and any organic radical. Both $R_7$ and $R_8$ can be organic radicals, preferably hydrocarbon, aroyl, and acyl radicals, carrying, if desired, substituents, such as halogens, etc. The most preferred peroxides are the diaroyl and diacyl peroxides.

Examples of suitable peroxides, which are in no way limiting, include benzoyl peroxide; lauroyl peroxide; tertiary butyl peroxide; 2,4-dichlorobenzoyl peroxide; tertiary butyl hydroperoxide; cumene hydroperoxide; diacetyl peroxide; acetyl hydroperoxide; diethylperoxycarbonate; tertiary butyl perbenzoate; and the various compounds, such as the perborates.

The azo-type compounds, typified by alpha,alpha'-azo-bis-isobutyronitrile, are also well-known free-radical promoting materials. These azo compounds can be defined as those having present in the molecule group

wherein the valences are satisfied by organic radicals, at least one of which is preferably attached to a tertiary carbon. Other suitable azo compounds include, but are not limited to, p-bromobenzenediazonium fluoborate; p-tolyldiazoaminobenzene; p-bromobenzenediazonium hydroxide; azo-methane and the phenyldiazonium halides. A suitable list of azo-type compounds can be found in U.S. Pat. No. 2,551,813, issued May 8, 1951 to Paul Pinkney.

The amount of initiator to employ, exclusive of radiation, of course, depends to a large extent on the particular initiator chosen, the olefinic charge stock and the reaction conditions. The initiator must, of course, be soluble in the reaction medium. The usual concentrations of initiator are between 0.001:1 and 0.1:1 moles of initiator per mole of maleic anhydride, with preferred amounts between 0.005:1 and 0.03:1. In general, the more reactive olefins, such as the vinylidene-type, require smaller amounts of the initiator.

The polymerization temperature must be sufficiently high to break down the initiator to produce the desired free-radicals and to maintain the monomers in solution. For example, using benzoyl peroxide as the initiator, the reaction temperature can be between 75° C. and 90° C., preferably between 80° C. and 85° C. Higher and lower temperatures can be employed, a suitable broad range of temperatures being from about 50° C. to 200° C., with preferred temperatures being from 60° C. to 120° C.

The reaction pressure can be atmospheric or below, but superatmospheric pressures of up to 1,000 p.s.i.g. or higher can be used. The preferred pressure is, of course, atmospheric pressure. The reaction time is suitably between 1 and 24 hours, with preferred reaction times between 2 and 10 hours.

The copolymers of this invention generally have inherent viscosities of between 0.05 and 1.5 deciliters per gram. This is measured by dissolving five grams of copolymer in one deciliter of acetone and measuring the inherent viscosity at 25° C. This inherent viscosity is a measure of molecular weight. Copolymers having higher or lower molecular weights, i.e., higher or lower viscosities, can be prepared.

As noted above, the subject reaction is a solution-type polymerization reaction. The olefin, maleic anhydride, solvent and initiator can be brought together in any suitable manner. The important factors are intimate contact of the olefin and maleic anhydride in the presence of a free-radical producing material. The reaction, for example, can be conducted in a batch system where the olefin is added all initially to a mixture of maleic anhydride, initiator and solvent or the olefin can be added intermittently or continuously to the reaction pot. In another manner, the components in the reaction mixture can be added continuously to a stirred reactor with continuous removal of a portion of the product to a recovery train or to other reactors in series. The reaction can also suitably take place in a coil-type reactor where the components are added at one or more points along the coil.

The reaction solvent, as noted above, must be an aliphatic ketone having from three to five carbon atoms. Thus, suitable solvents include acetone, methylethylketone, diethylketone and methylpropylketone.

It has been found that the above ketones dissolve the maleic anhydride and olefinic monomers at reaction temperature so as to bring them into intimate contact in the solution polymerization reactor and yet permit selective precipitation of the unreacted olefin monomer when the reaction mixture is cooled to a temperature less than the crystallization temperature of the olefin monomer.

By a "crystallization temperature" is mean that temperature where the dissolved olefin monomer changes from the dissolved to a solid state of definite, ordered and characteristic shape. Typical crystallization temperatures for the olefin monomers of this invention vary from about 40° F. to 100° F. and are usually in the range of about 45° F. to 75° F. That a suitable crystallization temperature has been reached is observed by the precipitation of the olefinic monomers in a finely divided filterable solid form. The preferred precipitation temperature is from 5° F. to 15° F. below the observed crystallization temperature.

However, it has also been found that as the reaction temperature is reduced, the copolymer is less soluble in the ketone and tends to form a gel and solidifies the entire reaction mixture. The precipitated olefins are encapsulated in the gel, causing difficulties in achieving the desired separation of the olefin monomers. This latter difficulty can be overcome by the presence of a sufficient amount of the aliphatic ketone so as to maintain the copolymer in solution not only at reaction temperature but also at the lower temperature where the olefin monomers precipitate. While all of the necessary amount of ketone can be present during the copolymerization reaction stage, this is not preferred since the additional quantities of ketone must then be heated to reaction temperature and then cooled to below the desired crystallization temperature of the olefinic monomer. Rather, it is preferred to utilize a sufficient amount of ketone during the copolymerization step to maintain the monomers and copolymer in solution and then to add the reaction solution comprising the unreacted monomers, copolymer and ketone to further amounts of ketone maintained at a temperature less than the crystallization temperature of the olefin monomer. The rate of addition of reaction product should be such that the olefin monomers precipitate in a solid finely divided filterable form. An excess amount of ketone is preferably employed as the precipitating medium but at least a sufficient amount of further ketone is employed to maintain the formed copolymer in solution at the lower crystallization temperatures. Usually the weight ratio of ketone to olefin monomer employed during the copolymerization stage is from 0.1:1 to 10:1, although much higher ratios up to 100:1 or more can suitably be employed. The usual final weight ratio of ketone to olefin monomer in the olefin precipitation step is from 5:1 to 20:1. In the preferred embodiment, the initial weight ratio of ketone to olefin in the precipitation step is very high since the copolymer reaction product is added slowly to an excess of ketone.

As noted above, it is preferred to use minimum amounts of ketone in the polymerization reactor to maintain a workable solution. It is further preferred to add the reaction product solution at or about reaction temperature to additional ketone maintained at the desired cool temperature. The rate of addition of the reaction product solution to the ketone is not critical but should be such as to result in the precipitation of the unreacted olefin monomer(s) in a finely divided filterable solid form. The size of the precipitated monomer(s) will also be affected by the temperature of both the reaction product solution and the additional ketone, a finer precipitation being formed as the difference between the two temperatures increases.

After the unreacted monomers are selectively precipitated as noted above, they can be separated from the copolymer, ketone solvent and small or residual amounts of unreacted maleic anhydride. Suitable separation can be achieved by filtration or centrifugation.

The remaining solution of the desired copolymer in the ketone can be treated in any suitable manner to effectuate a separation of the desired copolymer from the ketone solvent. For example, the solvent ketone can be evaporated from the copolymer, and the resulting solid can be pulverized by any suitable means and washed, if desired, with an alcohol, such as methanol, to remove any unreacted maleic anhydride. Another method of separating the copolymer from the ketone solvent, however, is to precipitate the copolymer from the ketone solvent by pouring the ketone solvent slowly into an excess of an aliphatic monohydroxy alcohol having from one to three carbon atoms. Examples of suitable alcohols include methanol, ethanol, n-propanol and isopropanol. It has been found that the copolymers precipitate in the above-described alcohols in a finely divided readily filterable form because of the absence of unreacted monomers. The copolymers can then suitable be recovered by filtration or centrifugation and washed with additional amounts of alcohol, if required, to remove any traces of maleic anhydride.

The temperature for the precipitation of the copolymers from solution in the ketone should be such that the copolymer precipitates in a finely divided form. Too high a temperature will result in solubilization of the copolymer or the precipitation of a sticky unfilterable mass. Suitable temperatures for precipitation are from 0° C. to 50° C., with preferred precipitation temperatures being from 20° C. to 30° C. with room temperature (25° C.) being particularly preferred. The pressure is, of course, preferably atmospheric, but higher pressures can be employed if desired to maintain either the ketone, solvent or alcohol in the liquid phase.

The weight ratio of alcohol to ketone during the precipitation step should be in excess of 1:1 and is preferably between 2:1 and 6:1. Higher weight ratios from 10:1 to 100:1 can be employed if desired, but for economical reasons the higher ratios are not desired.

It is also preferred, of course, to employ an alcohol in the precipitating step which has a boiling point sufficiently different from the ketone solvent so that the alcohol can be easily separated from the ketone by fractionation at either atmospheric or reduced pressures.

It has also been found that if the copolymers are recovered by the alcohol precipitation procedure described above, that the alcohols tend to react with the copolymers to produce unwanted half-ester moieties in the copolymer products. These half-ester moieties can, however, suitably be removed from the copolymer products by heating the copolymer products at a temperature from 80° C. to 200° C., preferably from 100° C. to 150° C., under vacuum while removing alcohol as quickly as it is formed for a time sufficient to result in the conversion of the half-ester moieties to cyclic anhydride groups and alcohol.

The copolymer products are essentially a chain of alternate groupings of maleic anhydride and the olefinic monomer reactants, this being true even though much higher or lower ratios of olefin to maleic anhydride than 1:1 were employed. The copolymers are useful for many purposes, including their use as dispersants for pigments, or an intermediate in the preparation of polyesters by their reaction with polyols or polyepoxides.

The invention will be further described with reference to the following experimental work.

A mixture of aliphatic alpha-olefins having at least 30 carbon atoms per molecule was prepared by the telomerization of ethylene using aluminum triethyl as the catalyst. The mixture of olefins was the bottoms product from the steam fractionation of the $C_{12+}$ reaction product from the telomerization process. The mixture of olefins contained greater than 75 weight percent olefins having from about 30 to 40 carbon atoms per molecule and greater than 90 weight percent olefins having from about 30 to 50 carbon atoms per molecule.

A copolymer of maleic anhydride and the above-described mixture of olefins was prepared by adding 190.8 grams (~0.4 mole) of the mixture of olefins to a reaction mixture consisting of 542.3 grams (7.5 moles) of methylethylketone, 19.6 grams (0.2 mole) of maleic anhydride, and 0.5 gram (.002 mole) of benzoyl peroxide as the initiator. The addition was made at room temperature and the reaction temperature was increased to 80° C. at a pressure of atmospheric for a reaction time of four hours.

The reaction product was a solution of the maleic anhydride —$C_{30+}$ olefin copolymer and some unreacted monomers in methylethylketone. This reaction product was then treated as shown in the following examples.

EXAMPLE 1

The reaction product solution was cooled to a temperature of about 30° C. where it completely solidified to a gel-like structure.

EXAMPLE 2

The reaction product solution (25 grams) was slowly poured with vigorous stirring into 100 grams of methylethylketone at 30° C. A filterable precipitate was formed and separated by filtration. Analysis of the precipitate showed that it was substantially completely unreacted olefinic monomeric charge stock.

The remaining solution was heated to a temperature of 80° C. to evaporate the methylethylketone solvent. The resulting solidified cake analyzed substantially pure copolymer with traces of maleic anhydride.

EXAMPLE 3

Example 2 was repeated except the copolymer solution after precipitation of the monomers was slowly added to 100 grams of methanol at 25° C. The resulting precipitate was washed with added amounts of methanol and analysis showed the presence of small amounts of half-ester moieties. Upon heating the precipitate copolymer at a temperature of 120° C. for 12 hours under a vacuum of 100 millimeters of mercury, the resulting product was a maleic anhydride-olefin copolymer substantially free of half-ester groups.

EXAMPLE 4

Example 3 was repeated except ethanol was employed as the precipitating alcohol and substantially the same results were obtained.

EXAMPLE 5

Example 3 was repeated except n-propanol was employed as the precipitating alcohol and substantially the same results were obtained although filtration was a little slower.

EXAMPLE 6

Example 3 was repeated except n-butanol was employed as the precipitating alcohol and substantially the same results were obtained except the precipitate was very fine and the filtration was somewhat slower.

Resort may be had to such variations and modifications as fall within the spirit of the invention and the scope of the appended claims.

We claim:

1. A process for the preparation of a copolymer of maleic anhydride and an aliphatic olefin having at least about 30 carbon atoms per molecule substantially free of unreacted aliphatic olefin monomer which comprises:
copolymerizing maleic anhydride and at least one of said olefins in the presence of a free-radical catalyst and a sufficient amount of an aliphatic ketone solvent having from 3 to 5 carbon atoms to maintain the maleic anhydride, aliphatic olefin and the resulting copolymer in solution at the reaction temperature;
cooling said copolymer reaction product to a temperature less than the crystallization temperature of said aliphatic olefin to precipitate said aliphatic olefin in a filterable solid form while maintaining said copolymer in solution by the addition of further amounts of an aliphatic ketone having from 3 to 5 carbon atoms if required;
separating said precipitated aliphatic olefin; and
thereafter separating said copolymer from said aliphatic ketone having from 3 to 5 carbon atoms.

2. A process for the preparation of a copolymer of maleic anhydride and an aliphatic olefin having at least about 30 carbon atoms per molecule substantially free of unreacted aliphatic olefin monomer which comprises:
copolymerizing maleic anhydride and at least one of said olefins in the presence of a free-radical catalyst and a sufficient amount of an aliphatic ketone solvent having from 3 to 5 carbon atoms to maintain the maleic anhydride, aliphatic olefin and the resulting copolymer in solution at the reaction temperature;
adding said copolymer reaction product to a further amount of said aliphatic ketone having from 3 to 5 carbon atoms while maintaining the temperature less than the crystallization temperature of said aliphatic olefin, the further amounts of aliphatic ketone being sufficient to result in the precipitation of said olefin in a finely divided filterable form while maintaining said copolymer in solution;
separating said precipitated aliphatic olefin; and
thereafter separating said copolymer from said aliphatic ketone having from 3 to 5 carbon atoms.

3. A process according to claim 2 wherein said copolymer is separated from said ketone by adding the solution of said copolymer in said ketone to an aliphatic monohydroxy alcohol having from 1 to 3 carbon atoms at a rate such that the copolymer precipitates in a finely divided filterable solid form.

4. A process according to claim 3 wherein said alcohol is methanol or ethanol.

5. A process according to claim 2 wherein said ketone is methylethylketone.

6. A process according to claim 2 wherein the copolymer solution is cooled to a temperature between 25° C. and 50° C. and the precipitated aliphatic olefin is removed by filtration.

7. A process according to claim 2 wherein the olefin is a mixture of even numbered olefins having greater than 75 weight percent of alpha-olefins having from about 30 to 40 carbon atoms per molecule.

8. A process according to claim 7 wherein the solvent is methylethylketone and the copolymer is separated from the methylethylketone by precipitation of the copolymer in an aliphatic alcohol having from 1 to 2 carbon atoms followed by filtration or centrifugation.

9. A process according to claim 3 wherein said separated copolymer is dried at a temperature in excess of 80° C.

References Cited

UNITED STATES PATENTS

| | | | |
|---|---|---|---|
| 3,119,801 | 1/1964 | Haskell | 260—94.9 |
| 3,441,543 | 4/1969 | Heilman | 260—78.5 |
| 3,461,108 | 8/1969 | Heilman et al. | 260—78.5 |

OTHER REFERENCES

Techniques of Organic Chem., vol. III, 2nd edition, Part I, Separation and Purification.

JOSEPH L. SCHOFER, Primary Examiner

J. KIGHT, III Assistant Examiner

U.S. Cl. X.R.

260—34.2